United States Patent [19]
Gregory et al.

[11] Patent Number: 5,233,014
[45] Date of Patent: * Aug. 3, 1993

[54] RAPID ADVANCEMENT OF MOLECULAR WEIGHT IN POLYBENZAZOLE OLIGOMER DOPES

[75] Inventors: Thomas Gregory, Midland, Mich.; Carl W. Hurtig, Parkweg, Fed. Rep. of Germany; Harvey D. Ledbetter, Pinehurst, N.C.; Kenneth J. Quackenbush, Saginaw; Steven Rosenberg, Midland, both of Mich.

[73] Assignee: The Dow Chemical Company, Midland, Mich.

[*] Notice: The portion of the term of this patent subsequent to Feb. 18, 2009 has been disclaimed.

[21] Appl. No.: 806,110

[22] Filed: Dec. 9, 1991

Related U.S. Application Data

[63] Continuation-in-part of Ser. No. 600,549, Oct. 19, 1990, Pat. No. 5,089,591.

[51] Int. Cl.$^5$ .............. C08G 63/00; C08G 63/02; C08G 69/42
[52] U.S. Cl. .................. 528/185; 528/179; 528/183; 528/272; 528/274; 528/337; 528/342
[58] Field of Search .......... 528/179, 183, 185, 272, 528/274, 337, 342

[56] References Cited

U.S. PATENT DOCUMENTS

| | | | |
|---|---|---|---|
| 4,423,202 | 12/1983 | Choe | 528/179 |
| 4,533,693 | 8/1985 | Wolfe | 524/417 |
| 4,578,432 | 3/1986 | Tsai | 525/432 |
| 4,608,427 | 8/1986 | Sweeney | 528/179 |
| 4,772,678 | 9/1988 | Sybert | 528/179 |
| 4,820,793 | 4/1989 | Imai | 528/183 |
| 4,845,183 | 7/1989 | Mueller | 528/185 |
| 4,847,350 | 7/1989 | Harris | 528/179 |
| 4,900,805 | 2/1990 | Arnold | 528/337 |
| 4,948,867 | 8/1990 | Nishino | 528/337 |
| 5,089,591 | 2/1992 | Gregory et al. | 528/185 |

OTHER PUBLICATIONS

Wolfe et al., "Rigid-Rod Polymers 1. Synthesis and Thermal Properties of Para-Aromatic Polymers with 2,6-Benzobisoxazole Units in the Main Chain," 14 Macromolecules 909 (1981).

Wolfe et al, "Rigid-Rod Polymers 2. Synthesis and Thermal Properties of Para-Aromatic Polymers with 2,6-Benzobisthiazole Units in the Main Chain," 14 Macromolecules 915 (1981).

*Primary Examiner*—John Kight, III
*Assistant Examiner*—T. Mosley

[57] ABSTRACT

The invention is a condensation polymerization reaction in which functionally terminated polybenzazole ligomers are reacted in a solvent acid at a temperature of at least 150° C. and a shear of at least about 10 sec.$^{-1}$ under conditions so that the desired molecular weight is reached in no more than about 4 hours. The oligomers may be, for example, derived from the reaction of 4,6-diaminoresorcinol bis(hydrochloride) and terephthalic acid. The concentration of oligomers is high enough so that the reaction mixture contains liquid crystalline domains.

17 Claims, No Drawings

RAPID ADVANCEMENT OF MOLECULAR WEIGHT IN POLYBENZAZOLE OLIGOMER DOPES

CROSS-REFERENCE TO RELATED APPLICATION

This application is a continuation-in-part of copending U.S. application Ser. No. 600,549 filed Oct. 19, 1990, now U.S. Pat. No. 4,089,591.

BACKGROUND OF THE INVENTION

This invention relates to the art of polybenzazole (PBZ) polymers and processes for synthesizing them.

Polybenzazole polymers are a known class of polymers comprising polybenzoxazole (PBO), polybenzothiazole (PBT), polybenzimidazole (PBI) and copolymers of these polymers that are described in Wolfe, *Liquid Crystalline Polymer Compositions, Process and Products*, U.S. Pat. No. 4,533,693 (Aug. 6, 1985): and 11 Ency. Poly. Sci. & Eng., *Polybenzothiazoles and Polybenzoxazoles*, 601 (J. Wiley & Sons 1988), which are incorporated herein by reference.

Polybenzazoles are generally classified as AB-polymers, containing a plurality of mer units depicted in formula 1(a), or AA/BB, containing a plurality of mer units which conform with formula 1(b)

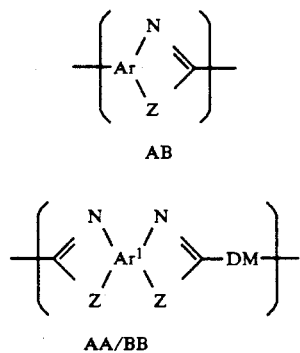

wherein:
each Ar is an aromatic group,
DM is a divalent organic moiety which is stable and inert under polymerization conditions, and
each Z is independently an oxygen atom, a sulfur atom, or a nitrogen atom that is bonded to a hydrogen atom or an organic moiety which is stable and inert in acid under polymerization conditions.

(For the purpose of this application, when the nitrogen atoms and Z moieties of a mer unit are depicted as bonded to an aromatic group without indicating their position, as in Formulae 1(a)-(b), it shall be understood that:

(1) each nitrogen atom and Z group within a given azole ring are bonded to the aromatic group in ortho position with respect to each other; and (2) if the mer unit has two azole rings, one nitrogen atom and Z moiety may be in either cis position or trans position with respect to the other nitrogen atom and Z moiety, for example illustrated in 11 Ency. Poly. Sci. & Eng., *Polybenzothiazoles and Polybenzoxazoles*. at 602 (J. Wiley & Sons 1988), which is incorporated herein by reference. The same understandings apply with respect to amine groups and Z moieties in a BB-PBZ monomer.)

Polybenzazoles are synthesized by (1) the reaction of at least one AA-PBZ monomer containing two electron-deficient carbon groups with at least one BB-PBZ monomer containing two o-amino-basic moieties and-/or (2) the condensation of one or more AB-PBZ monomers containing an aromatic group, an o-amino-basic moiety and an electron-deficient carbon group. The reaction is illustrated generally in Formula 2:

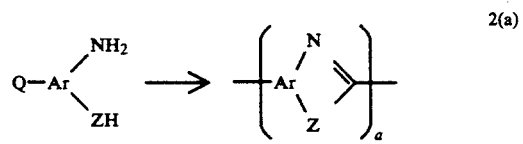

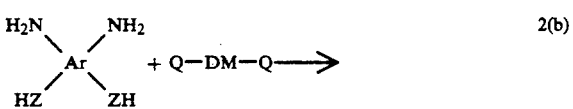

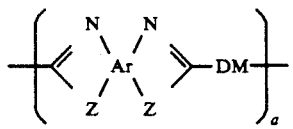

wherein each Q is an electron-deficient carbon group and all other moieties have the meaning and preferred embodiments previously given.

The divalent organic moiety DM of the AA-monomer ordinarily comprises an aromatic group, which is most usually a p-phenylene group. The reaction is ordinarily carried out under non-oxidizing conditions in a non-oxidizing, dehydrating solvent acid, which is most frequently polyphosphoric acid.

The known reaction conditions are unsuitable for synthesizing large quantities polybenzazole polymer. The most commonly used reaction techniques, as described in U.S. Pat. No. 4,533,693, which is previously incorporated by reference, require days to synthesize a few hundred grams of high molecular weight polymer. What is needed is a process to quickly polymerize polybenzazole polymers of high molecular weight.

SUMMARY OF THE INVENTION

The polymerization of PBZ monomers is a condensation reaction. It has surprisingly been found that the speed at which polybenzazole monomers and oligomers condense to form higher molecular weight polymer in a solvent acid solution is highly dependent upon the shear placed upon the solution during the polymerization. Under no shear polymerization occurs very slowly. As shear increases, the speed of reaction also increases.

One aspect of the present invention is a process for synthesizing a polybenzazole polymer comprising the step of maintaining a liquid crystalline mixture containing solvent acid and functionally terminated polybenzazole oligomers at a temperature of at least about 150° C. under shear of at least about 10 sec.$^{-1}$ for a time and under condition such that a polybenzazole polymer is formed.

A second aspect of the present invention is a process for synthesizing polybenzazole polymers comprising the step of maintaining a mixture containing solvent acid and at least about 7 weight percent functionally terminated polybenzazole oligomers having an average degree of polymerization of at least about 20 at a temperature of at least about 150° C. under shear of at least about 10 sec.$^{-1}$ for a time and under conditions such that a polybenzazole polymer is formed.

A third aspect of the present invention is a process for synthesizing polybenzazole polymers comprising the step of maintaining a mixture, which has a viscosity of at least about 1000 poise at a shear of 15.9 sec.$^{-1}$ and a temperature of 150° C., containing solvent acid and functionally terminated polybenzazole oligomers at a temperature of at least about 150° C. under shear of at least about 10 sec.$^{-1}$ for a time and under conditions such that a polybenzazole polymer is formed.

Advancement of molecular weight according to the second step of the present invention may occur as quickly as a few minutes. The polymers can be formed into fibers and films that are useful structural materials.

DETAILED DESCRIPTION OF THE INVENTION DEFINITIONS

The following terms are used repeatedly throughout this application, and have the meaning and preferred embodiments defined herein unless otherwise specified.

AA-PBZ Monomer—A monomer suitable for synthesizing polybenzazole polymers, comprising two electron-deficient carbon groups linked by a divalent organic moiety (DM) which is stable so that it does not interfere with the synthesis, fabrication and use of the polybenzazole polymer. The electron-deficient carbon groups have the definition and preferred embodiments given herein. The divalent organic moiety is preferably alkyl or an aromatic group, as herein defined, is more preferably an aromatic group, and is most preferably a six-membered aromatic group. Examples of suitable AA-PBZ monomers and references to their synthesis are provided in U.S. Pat. No. 4,533,693 at Col. 25–32, Tables 4–6, which is incorporated herein by reference. Preferred examples of AA-PBZ monomers include terephthalic acid, isophthalic acid, bis-(4-benzoic) acid and oxy-bis-(4-benzoic acid) and acid halides thereof.

AB-PBZ Monomer—A monomer suitable for synthesizing polybenzazole polymers, comprising an aromatic group, an o-amino-basic moiety bonded to the aromatic group, and an electron-deficient carbon group linked to the aromatic group. The aromatic group, the electron-deficient carbon group and the o-amino-basic moiety have the definitions and preferred embodiments given herein. Examples of suitable AB-monomers and processes for their synthesis are provided in U.S. Pat. No. 4,533,693 at Col. 33–35, Tables 7–8, which is incorporated herein by reference. Preferred examples of AB-monomers include 3-amino-4-hydroxybenzoic acid, 3-hydroxy-4-aminobenzoic acid and the acid halides thereof. AB-monomers are frequently stored as salts of hydrogen chloride or phosphoric acid, because the freebase of the monomer is susceptible to air oxidation.

o-Amino-basic moiety—a moiety, which is bonded to an aromatic group, consisting of (1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group.

The secondary amine group preferably comprises no more than about 6 carbon atoms, more preferably no more than about 4 carbon atoms and most preferably no more than about 1 carbon atom.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties (DL) which are inert with respect to PBZ polymerizing reagents under polymerization conditions. Suitable divalent moieties comprise, for example, a carbonyl group, a sulfonyl group, an oxygen atom, a sulfur atom, an alkyl group and/or and or a perfluorinated alkyl group. Each aromatic group is preferably a single six-membered ring.

Each aromatic group may contain substituents which are stable in solvent acid and do not interfere with further reactions of the moiety which the aromatic group is part of. Examples of preferred substituents include halogens, alkoxy moieties, aryloxy moieties or alkyl groups. More preferred substituents are either an alkyl group having no more than about 6 carbon atoms or a halogen. Most preferably, each aromatic group contains only those substituents specifically called for hereinafter.

Azole ring—an oxazole, thiazole or imidazole ring. The carbon atom bonded to both the nitrogen atom and the oxygen, sulfur or second nitrogen atom is the 2-carbon, as depicted in Formula 3

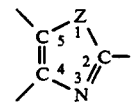

wherein Z is —O—, —S— or —NR—: and R is hydrogen, an aromatic group or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbon of each azole ring is ordinarily fused with an aromatic group.

Azole-forming moiety—an "o-amino-basic moiety" or "electron-deficient carbon group," as those terms are defined herein.

BB-PBZ Monomer—A monomer suitable for synthesizing polybenzazole polymers, comprising an aromatic group and two o-amino-basic moieties which are bonded to the aromatic group. The aromatic group and the o-amino-basic moieties have the definitions and preferred embodiments given herein. Examples of suitable BB-PBZ monomers and processes for synthesis are provided in U.S. Pat. No. 4,533,693 at Col. 19-24, Tables 1-3, which is incorporated herein by reference. Examples of preferred BB-PBZ monomers include 4,6-diaminoresorcinol, 2,5-diaminohydroquinone and 1,4-dithio-2,5-diaminobenzene. BB-PBZ monomers are frequently stored as salts of hydrogen chloride or phosphoric acid, because the free base of the monomer is susceptible to air oxidation.

Electron-deficient carbon group (Q)—any group containing a carbon atom which can react in the solvent acid with an o-amino-basic moiety to form an azole ring, such as the groups listed in Col. 24, lines 59-66 of the 4,533,693 patent, which is incorporated herein by reference. Preferred electron-deficient carbon groups are carboxylic acids, acid halides, metal carboxylate salts, cyano groups and trihalomethyl groups. Halogens in electron-deficient carbon groups are preferably chlorine, bromine or iodine and more preferably chlorine.

Polybenzazole (PBZ) polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each mer unit contains an oxazole ring bonded to an aromatic group, which need not necessarily be a benzene ring. The term "polybenzoxazole (PBO)" also refers broadly to poly(phenylene-benzobis-oxazole)s and other polymers wherein each mer unit comprises a plurality of oxazole rings fused to an aromatic group. The same understandings shall apply to the terms polybenzothiazole (PBT) and polybenzimidazole (PBI).

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer", Kansai Committee of the Society of Fiber Science and Technology, Japan, Post Symposium on Formation, Structure and Properties of High Modulus and High Tenacity Fibers 23-26 (Aug. 26, 1985): Evers et al., "Articulated All-Para Polymers with 2,6-Benzobisoxazole, 2,6-Benzobisthiazole, and 2,6-Benzobisimidazole Units in the Backbone," 14 Macromolecules 925 (1981): Evers, "Thermooxidatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and consist essentially of mer units having an angle of catenation of at least about 150°. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

Solvent acid—any non-oxidizing liquid acid capable of dissolving PBZ polymers, such as sulfuric acid, methanesulfonic acid, trifluoromethylsulfonic acid, polyphosphoric acid and mixtures thereof. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide. Preferred concentrations of $P_2O_5$ in the methanesulfonic acid are described in U.S. Pat. Nos. 4,847,350 and 4,722,678, which are incorporated by reference. Concentrations of $P_2O_5$ in the polyphosphoric acids are described in U.S. Pat. Nos. 4,533,693 and 4,722,678, which are incorporated by reference.

DESCRIPTION OF THE INVENTION

Polybenzazole polymers, their properties and their synthesis are discussed in detail in the following references: Sybert et al., *Liquid Crystalline Polymer Compositions, Process and Products* U.S. Pat. No. 4,772,678 (Sep. 20, 1988); Wolfe et al., *Liquid Crystalline Polymer Compositions, Process and Products*, U.S. Pat. No. 4,703,103 (Oct. 27, 1987): Wolfe et al., *Liquid Crystalline Polymer Compositions, Process and Products*, U.S. Pat. No. 4,533,692 (Aug. 6, 1985): Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985): Imai et al., "Polybenzoxazoles and Polybenzothiazoles," 83 Makromol Chem. 167 (1965), Evers, *Thermooxadatively Stable Articulated p-Benzobisoxazole and p-Benzobisthiazole Polymers*, U.S. Pat. No. 4,359,567 (Nov. 16, 1982): Tsai et al., *Method for Making Heterocyclic Block Copolymer*, U.S. Pat. No. 4,578,432 (Mar. 25, 1986) and 11 Ency. Poly. Sci. & Eng., *Polybenzothiazoles and Polybenzoxazoles*, 601 (J. Wiley & Sons 1988), which are incorporated herein by reference.

It is convenient to think of the synthesis of polybenzazole polymers as occurring in four stages. In the first (mixing) stage, at least the AB-PBZ and/or BB-PBZ monomers are mixed with a solvent. In the second (devolatilization) stage, volatile protecting acids are drawn off from the reaction mixture, if necessary. In the third (oligomerization) stage, the monomers react to form oligomers. In the fourth (advancement) stage, the oligomers react to form higher molecular weight polymer. The processes of the present invention preferably correspond roughly to the advancement stage. The first three stages are preferably used to make a reaction mixture suitable for use in the processes of the present invention.

There is no sharp dividing line for these stages. Devolatilization may commence as the monomers are mixed with the solvent. The devolatilization and oligomerization stages may be carried out simultaneously in the same piece of equipment. There is not a generally recognized point at which a polymer is at too high a molecular weight for the oligomerization stage or too low a molecular weight for the advancement stage. Oligomerization and advancement may be carried out in a single reactor as a single continuous process, and even under similar conditions (although this is not preferred).

Certain reaction conditions are equally applicable in all stages. The reaction should take place in a solvent acid under dehydrating conditions. The conditions should be non-oxidizing, such as nitrogen or noble gas atmosphere or vacuum. The pressure may be atmospheric, subatmospheric or superatmospheric, but should permit the removal of volatile compounds that interfere with polymerization.

In the first stage of the process, a selected amount of AB-PBZ monomer and/or BB-PBZ monomer is mixed with a reaction solvent, which is preferably a solvent acid. The monomer is preferably a BB-PBZ monomer.

The monomers are more preferably chosen to provide a polybenzoxazole or polybenzothiazole polymer, and are most preferably chosen to provide a polybenzoxazole. The monomers are preferably chosen to provide a lyotropic liquid-crystalline polymer, and are more preferably chosen to provide a rigid rod polymer. The monomers are defined and further described in the definitions.

The amount of monomer is preferably sufficient to provide a liquid crystalline solution after the polymerization is complete. The concentration of monomer is preferably sufficient to provide a finished dope containing at least about 7 percent polymer, more preferably at least about 12 percent polymer and most preferably at least about 14 percent polymer, by weight. The maximum concentration of monomer is typically limited by practical considerations such as solubility and viscosity. Ordinarily the concentration of monomers is no more than would be necessary to provide a solution containing about 30 percent polymer, more typically no more than about 21 percent polymer, and most often no more than about 18 percent polymer. Optimum concentrations may vary depending upon the desired utility of the resulting polymer and the desired molecular weight of the resulting polymer.

AA-PBZ monomers may be added simultaneously with the BB-PBZ monomers, or the monomers may be added in any order sequentially. Preferably, AA-PBZ monomers are added about simultaneously with the BB-PBZ monomers. More preferably, the ratio of AA-PBZ monomers to BB-PBZ monomers added is about that described hereinafter for the oligomerization step.

The solvent is preferably a solvent acid, as previously defined, and is most preferably a polyphosphoric acid. The solvent may be a low $P_2O_5$ polyphosphoric acid (such as about 77 weight percent $P_2O_5$) or a commercial polyphosphoric acid (such as about 83 weight percent $P_2O_5$) at the time that mixing is commenced, but it preferably contains higher levels of $P_2O_5$ at the commencement of the oligomerization step, as described hereinafter. This is preferably accomplished by adding extra $P_2O_5$ to the solvent acid during the mixing step. The extra $P_2O_5$ is more preferably added to the solvent and mixed in at about the same time that the monomers are added and mixed in. A reducing agent, such as tin (II) chloride, may also be added to control oxidation or thermal degradation of the monomer.

The temperature of mixing is preferably at least about 25° C., more preferably at least about 45° C. and most preferably at least about 55° C. It is preferably low enough that the monomer does not substantially degrade. It is preferably no more than about 150° C., more preferably no more than about 100° C. and most preferably no more than about 70° C. Certain monomers, such as terephthalic acid, may be substantially insoluble in the solvent acid. Mixing need not be carried out to dissolve all monomers, but it is preferably carried out for a time sufficient to at least wet all monomer. The monomers and $P_2O_5$ are preferably micronized. Then the second (devolatilization) stage of the reaction is preferably commenced immediately.

The second (devolatilization) stage may be unnecessary with proper choice of monomers. Certain monomers, such as BB-PBZ monomer phosphate salts and terephthalic acids, do not release volatile compounds and do not require devolatilization. Reactions carried out without devolatilization are described in Harris et al., Ser. No. 341,502 (filed Apr. 21, 1989), which is incorporated herein by reference. If the monomers do release volatile components, such as hydrogen chloride from BB-PBZ monomer hydrohalide salts and terephthaloyl halides, then the reaction mixture should be devolatilized.

The temperature of the devolatilization stage should be high enough to drive out volatile protecting acids in a rapid fashion, and low enough to avoid substantial decomposition of the unpolymerized monomers. The temperature is preferably no more than about 190° C., more preferably no more than about 150° C., and most preferably no more than about 130° C. It is preferably at least about 40° C., more preferably at least about 60° C., and most preferably at least about 100° C.

The devolatilization is preferably carried out with vigorous mixing. Examples of suitable mixing equipment includes all of the equipment listed in U.S. Pat. No. 4,772,678 in Col. 44–45, which is incorporated herein by reference. Preferred examples include single or multiple screw extruders, piston-agitated reactors, Sigma blade mixers, helical mixers (such as dual helical ribbon mixer) and multiple impeller mixers.

When the solvent is polyphosphoric acid, it may contain as little as 76 percent $P_2O_5$ or less at the beginning of the devolatilization step, but it preferably contains at least about 80 weight percent $P_2O_5$, more preferably at least about 85 weight percent, and most preferably at least about 88 weight percent. The concentration of $P_2O_5$ in the polyphosphoric acid must be low enough to allow adequate mixing. It is preferably less than about 92 weight percent and more preferably no more than about 90 weight percent.

Under preferred conditions, devolatilization of 10 pounds or more of diaminoresorcinol bis(hydrogen chloride) salt can be essentially completed in a few hours. The rapid evolution of volatiles in viscous reaction mixtures may cause foaming, as previously described in the literature.

Foaming may be minimized by several techniques. For instance, the devolatilization reactor may have a high surface-to-volume ratio as described in U.S. Pat. No. 4,772,678, which is incorporated herein by reference. The BB-monomer salt may have a large particle size, such as at least about 40 mesh or greater. The larger particle is dissolved more slowly into the polyphosphoric acid, thus spreading out the evolution of the volatile acid. The monomers may be chosen to minimize the level of volatile components in the system, such as polymerizing terephthalic acid (rather than terephthaloyl chloride) with the BB-PBZ monomer phosphate or terephthalate salt. The mixing apparatus may be chosen to help break foam. The pressure in the reactor may be controlled to minimize foaming. The devolatilization reactor should have a reasonable amount of head space to permit some level of foaming.

If the reaction mixture contains both AA-monomers and BB-PBZ monomers during mixing and/or devolatilization, then the oligomers ordinarily begin forming during the devolatilization stage. Otherwise, the AA-PBZ monomer is preferably added and oligomerization is preferably commenced almost immediately after devolatilization is completed. If storage of the devolatilized solution is contemplated, the devolatilized reaction mixture is preferably stored after the oligomerization stage, rather than before it. The oligomerization stage is preferably commenced as quickly as possible.

The oligomerization step is carried out under known conditions. The solvent acid should be dehydrating, as described in U.S. Pat. Nos. 4,533,693 and 4,847,350, which are incorporated herein by reference. The solvent acid is preferably a polyphosphoric acid containing at least about 84 weight percent $P_2O_5$. It more preferably contains at least about 86 weight percent $P_2O_5$ and most preferably contains at least about 88 weight percent $P_2O_5$ at the commencement of the oligomerization stage. The temperature is preferably at least about 60° C., more preferably at least about 100° C. and most preferably at least about 120° C. It is preferably no more than about 190° C., more preferably no more than about 170° C., and most preferably no more than about 150° C. The oligomerization is carried out with vigorous agitation as previously described.

Staged reactions of monomers to form stable oligomers that may be stored and reacted later are described in Gregory et al., Ser. No. 07/600,551 (filed Oct. 19, 1990) which is incorporated herein by reference. The stoichiometry in such staged reactions may be slightly unbalanced or may be essentially equimolar. Preferably, neither monomer is in an excess of more than about 25 mole percent, more preferably no more than about 4 mole percent, during the oligomerization stage.

It is critical that the oligomers and/or low molecular weight polymers resulting from the oligomerization step have active end groups selected from the class consisting of o-amino-basic moieties and electron-deficient carbon groups. If the oligomers are capped, for instance by monofunctional reagents, the condensation reaction can not continue during the advancement stage and no further advancement is possible. Therefore, monofunctional capping agents are preferably not added during the oligomerization step. The active end groups are preferably predominantly o-amino-basic moieties.

No hard and fast rule governs the maximum molecular weight that can be reached in the oligomerization stage. When the oligomerization stage is carried out in a batch reactor, the stage should be terminated while the dope is still pumpable and stirrable. The oligomerization is preferably carried out until the polybenzazole reaches an average molecular weight at which the polybenzazole is substantially stable. "Substantially stable" means that the reaction mixture can be stored for at least 24 hours at pumpable temperatures and still be advanced to high molecular weight. The dope is preferably storable for at least about 48 hours and more preferably for at least about one week.

The average degree of polymerization at the end of the oligomerization stage is preferably at least about 5, more preferably at least about 10, and most preferably at least about 15. It is preferably at most about 75, more preferably at most about 50, and most preferably no more than about 40. The degree of polymerization may conveniently be tracked by measuring the viscosity of the reaction mixture, for instance by measuring the level of power needed for agitation. Such measurements are necessarily dependent upon the equipment used and the specific contents of the reaction mixture. They can easily be optimized by persons of ordinary skill in the art.

In one preferred embodiment, the mixing, devolatilization and oligomerization stages are carried out in a batch reactor. The solvent acid, AA- and BB-PBZ monomers and extra $P_2O_5$ (if any) are added simultaneously to the reactor with agitation at a temperature suitable for mixing. As mixing is accomplished, the temperature and agitation are adjusted for devolatilization and oligomerization.

Following the oligomerization stage, the dope may be stored as previously described or may be pumped directly over to the advancement stage. Storage is preferably at a temperature at which the reaction mixture remains pumpable, as previously described. The temperature for storage is preferably no more than about 160° C. and more preferably no more than about 120° C. The storage should be under non-oxidizing conditions, and preferably under essentially no shear. It is more preferably in a separate storage tank to free up the reaction vessels for mixing, devolatilization and oligomerization of a new batch.

The advancement stage is carried out under high temperature and, at least in part, under high shear. The temperature is preferably at least about 175° C. and more preferably at least about 190° C. It is preferably at most about 300° C., more preferably at most about 230° C., and most preferably no more than about 220° C. The shear is at least about 10 sec.$^{-1}$. It is preferably at least about 100 sec.$^{-1}$, more preferably at least about 300 sec.$^{-1}$ and most preferably at least about 500 sec.$^{-1}$. The shear is limited primarily by practical considerations, such as viscosity. It is preferably no more than about 1000 sec.$^{-1}$, and more preferably no more than about 700 sec.$^{-1}$.

High shear, as previously described, may be used in the mixing, devolatilization and oligomerization stages. In reactions of the present invention at least some advancement is carried out under high shear. Several different conditions may be used to measure when high shear is desirable in reactions of the present invention. High shear is preferably maintained with polymers having an average degree of polymerization beyond that spelled out for the oligomerization step, as previously described. The reaction is preferably continued under high shear for at least part of the polymerization after the conversion of monomer is at least about 90 percent, and more preferably until the conversion reaches at least about 100 percent. Most preferably, high shear is maintained throughout the entire advancement stage.

The dope under high shear is preferably liquid crystalline. High shear is useful for advancement of dopes having a viscosity at 15.9 sec.$^{-1}$ shear and 150° C. of at least about 1000 poise, more preferably at least about 5000 poise and most preferably at least about 6500 poise. The viscosity is typically governed by several factors, including oligomer molecular weight and oligomer concentration.

The advancement stage is preferably carried out under subatmospheric pressure. The pressure is preferably no more than about 150 mmHg. The minimum pressure is dictated primarily by practical concerns. It is conveniently at least about 1 mmHg.

The solvent in the advancement stage should be dehydrating. For instance, polyphosphoric acid preferably contains at least about 82 weight percent $P_2O_5$ and most preferably at least about 83 weight percent, at the beginning of advancement.

The stoichiometry in the advancement stage must allow the oligomers to condense to form polymers of a relatively higher average molecular weight. If the oligomerization stage was run using a stoichiometric excess of one monomer (particularly a BB-PBZ monomer), the monomer level in the reaction mixture may be adjusted to provide a polymer having the desired molecular weight, such as by adding about a stoichiometric amount of AA-PBZ monomer as a chain extender.

A chain terminator may be added if it is desirable to hold the molecular weight down during advancement. Examples of suitable chain terminators are described in Wolfe, U.S. Pat. No. 4,772,678 at Col. 22-27 (Sep. 20, 1988), which is incorporated by reference. Suitable chain terminators are typically monofunctional carboxylic acids or derivatives, or o-aminophenols or o-aminothiols or o-diamines. Examples of suitable monofunctional carboxylic acid type terminators include benzoic acid, phenylbenzoic acid, cyclohexane carboxylic acid, picolinic acid, naphthoic acid, acetic acid, propionic acid, and acid halide, ester or nitrile derivatives thereof. Examples of other suitable terminators include o-aminophenol, phenyl-2-aminophenol, o-aminonaphthol and variations wherein the hydroxy group is replaced with a thiol or amino group.

The quantity of chain terminator added is preferably equal to no more than about 5 mole percent of the monomers added, more preferably no more than about 2 mole percent and most preferably no more than about 1 mole percent. Preferably, the stoichiometry of the reaction is adjusted such that the number of reactive sites provided by AA-monomers is essentially equal to the number of sites provided by the BB-PBZ monomer and aminophenolic terminator.

The advancement may be carried out in a batch reactor, such as a piston-agitated reactor. It may be carried out in the same reactor used for the oligomerization and/or other stages. In a preferred embodiment of the present invention, the advancement step is carried out in a reactor that reacts relatively small quantities of the reaction mixture in a continuous fashion for a relatively short residence time under conditions that will cause the reaction to complete in that time frame. Examples of suitable reactors include single and multiple screw extruders. The build up in molecular weight during the advancement step can be measured for material leaving the reactor. Then the level of AA-PBZ monomer and/or chain terminator added before or during advancement step can be adjusted until the polymer leaving the reactor has the desired molecular weight.

The residence time of dope from commencement to completion of the advancement stage is preferably no more than about four hours, more preferably no more than about two hours and most preferably no more than about one hour. Under preferred conditions, dope can be advanced to final molecular weight in no more than about 15 minutes. The minimum time is preferably at least about 1 minute and more preferably at least about 5 minutes. The optimum residence time for advancement varies depending upon several factors, including the contents of the dope entering the reactor and the reactor conditions. Persons of ordinary skill in the art readily determine the optimum conditions for their own equipment without undue experimentation.

If the reaction is not completed to the desired level of advancement, the reaction mixture may even be recirculated through the advancement reactor with a chain extender, such as AA-PBZ monomer. The reaction is preferably completed in one pass.

The dope resulting from advancement contains solvent and polybenzazole polymer. The average molecular weight of the polymer should be higher than the average molecular weight of oligomers after the oligomerization stage. The polymer preferably has an average degree of polymerization of at least about 20, more preferably at least about 30 and most preferably at least about 40. The optimal degree of polymerization may vary depending upon the application. For some applications the best degree of polymerization may be at least about 50, 100 or even 150.

When the polymer is a rigid rod polybenzoxazole or polybenzothiazole, it preferably has an single point intrinsic viscosity (in methanesulfonic acid at 25° C.) of at least about 5 dL/g, more preferably at least about 10 dL/g and most preferably at least about 15 dL/g. The single point intrinsic viscosity may go as high as 60 dL/g or more, but it is preferably no more than about 50 dL/g and more preferably no more than about 40 dL/g. The optimal single point intrinsic viscosity may vary depending upon the application. For some applications the best single point intrinsic viscosity may be at least about 20, 25 or even 30 dL/g.

The growth in intrinsic viscosity during the advancement stage is preferably at least about 5 dL/g for a rigid rod polymer, more preferably at least about 10 dL/g, and most preferably at least about 15 dL/g. (The intrinsic viscosity is measured in a methanesulfonic acid at 30° C.) The average molecular weight of the polymer preferably increases by at least about 50 percent and more preferably at least about 100 percent.

The dope can be spun to form fibers or extruded to form films according to known processes, such as the processes described in *The Materials Science and Engineering of Rigid Rod Polymers*, 245-297 (Materials Research Society 1989), which is incorporated herein by reference. The fibers are useful in fiber-based composites and the films are useful laminates.

Advancement to final molecular weight under the conditions of the present invention proceeds more rapidly and, if desired, to higher molecular weight than was previously possible. The residence time in a continuous reactor may be as low as 10 to 20 minutes. Combined with an efficient procedure for mixing, devolatilization and oligomerization, the process of the present invention may yield dopes containing high concentrations of high molecular weight polybenzazole polymer only a few hours after the reaction is commenced.

Illustrative Embodiments

The following examples are given to illustrate the invention and should not be interpreted as limiting it in any way. Unless stated otherwise, all parts and percentages are given by weight.

EXAMPLE 1

A standard procedure for mixing, dehydrohalogenation and oligomerization of polybenzazole dopes is established. A 100 lb quantity of polyphosphoric acid containing 83.7 weight percent $P_2O_5$ is added to a 25 gallon reactor with agitation by a helical dual ribbon impeller. The following dry materials are added at about 60° C. under nitrogen atmosphere: 19.01 pounds of diaminoresorcinol bis(hydrogen chloride); 14.822 pounds of terephthalic acid; and 21.988 pounds of $P_2O_5$. Mixing is continued for 1 hour at 60° C. and for about 6 hours at about 120° C. Hydrogen halide gas evolved is drawn off and recovered. The reaction temperature is raised to 40° C., until a viscosity of about 300 poise is reached. The resulting solution is pumped into a tank and stored under nitrogen atmosphere at about 120° C.

The reaction mixture is pumped through a twin screw extruder having about a 35:1 length to diameter ratio and an internal diameter of about 30 mm. The shear within the extruder is about 500 sec.$^{-1}$. The temperature is between 190° C. and 210° C. The residence time is about 6 minutes. The flow through the extruder is about 10 pounds of dope per hour. The extruder has syringe pump that can introduce a measured flow of liquid into the extruder. A solution of polyphosphoric acid and o-aminophenol is introduced as shown in Table 1. The dope leaving the extruder passes through a series of four static mixing elements. The effect of the chain terminator on the dope is monitored by monitoring the pressure drop across the mixers. The resulting polymer is recovered by precipitation in water. Its single point intrinsic viscosity is measured in methanesulfonic acid at 30° C. and a concentration of 0.05 g/dL. The single point intrinsic viscosity is shown in Table 1. It relates in a linear manner to the pressure drop across the mixers.

TABLE 1

| Sample | terminator concentration (%) | terminator solution (cc/hour) | inherent viscosity (dL/g) |
|---|---|---|---|
| 1 | 1 | 52.5 | 33.4 |
| 2 | 1 | 105 | 31.5 |
| 3 | 10 | 10.5 | 32.9 |
| 4 | 10 | 21 | 29.9 |
| 5 | 10 | 31.5 | 26.7 |
| 6 | — | 0 | 42.3 |

EXAMPLE 2

The process of Example 1 is repeated using an excess of 4,6-diaminoresorcinol and no terminator. The resulting polymer has an intrinsic viscosity of less than 25 dL/g. The syringe pump is used to add a mixture of 10 weight percent terephthalic acid and polyphosphoric acid at the rate indicated in Table 2. The pressure drop across the static mixers is measured, and an estimated single point intrinsic viscosity is calculated using the previously calculated relationship.

TABLE 2

| Sample | chain extender solution feed rate (g/hr) | Pressure Drop (psi) | estimated inherent viscosity (dL/g) |
|---|---|---|---|
| 7 | 0 | 91 | <25 |
| 8 | 0.59 | 130 | 28 |
| 9 | 0.89 | 160 | 31 |
| 10 | 1.19 | 201 | 34 |
| 11 | 1.48 | 205 | 35 |
| 12 | 1.78 | 183 | 33 |
| 13 | 2.37 | 165 | 31 |
| 14 | 2.97 | 153 | 30 |
| 15 | 3.56 | 133 | 28 |

EXAMPLE 3

A mixture containing 200 g of 4,6-diaminoresorcinol bis(hydrogen chloride), 116.85 g of micronized terephthalic acid, 947 g of 82.5 percent polyphosphoric acid, 6.3 g of tin (II) chloride dihydrate and 140 g of $P_2O_5$ is agitated under 1 mm Hg pressure using a helical dual ribbon impeller at 120° C. for 23 hours and at 150° C. for 3 hours, using a nitrogen purge with the outflow leading to a hydrochloric acid scrubbing device. Agitation is continued at 150° C. for 62 hours under 1 atmosphere nitrogen pressure. A 197 g quantity of $P_2O_5$ and 38.95 g of terephthalic acid are added at 120° C. The mixture is heated under nitrogen atmosphere at 210° C. in a piston-agitated reactor until it is completed. The shear within the reactor commences at about 300 sec.$^{-1}$, and declines to about 10 sec.$^{-1}$ as the viscosity of the dope increases with continued advancement. The resulting cis-PBO polymer has an single point intrinsic viscosity of about 31 dL/g in methanesulfonic acid at 25° C. and a concentration of 0.05 g/dL.

What is claimed is:

1. A process for synthesizing a polybenzazole polymer comprising the step of maintaining a liquid crystalline mixture containing solvent acid and functionally terminated polybenzazole oligomers at a temperature of at least about 150° C. under shear of at least about 10 sec.$^{-1}$ for a time and under conditions such that a polybenzazole polymer is advanced to a selected average molecular weight in no more than about 4 hours.

2. The process of claim 1 wherein the oligomers are oligomers of a lyotropic liquid-crystalline polybenzoxazole or polybenzothiazole or both.

3. The process of claim 2 wherein the shear is at least about 100 sec.$^{-1}$.

4. The process of claim 3 wherein the temperature is at least about 175° C.

5. The process of claim 4 wherein the shear is at least about 300 sec.$^{-1}$.

6. The process of claim 4 wherein the mixture contains at least about 7 weight percent oligomers having an average degree of polymerization of at least about 10.

7. The process of claim 4 wherein the mixture contains at least about 10 weight percent oligomers having an average degree of polymerization of at least about 15.

8. The process of claim 4 wherein the mixture has mixture has a viscosity of at least about 5000 poise at 150° C. and under shear of 15.9 sec.$^{-1}$.

9. The process of claim 4 wherein the oligomers are rigid rod oligomers.

10. The process of claim 9 wherein the intrinsic viscosity of the polybenzazole polymer, as measured in a mixture of methanesulfonic acid at 30° C., increases by at least about 5 dL/g.

11. The process of claim 10 wherein the advancement stage is completed in no more than about 2 hours.

12. The process of claim 4 wherein the oligomers are the reaction product of at least one AA-PBZ monomer which is terephthalic acid, bis-(4-benzoic acid) or an acid halide thereof, and at least one monomer BB-PBZ monomer which is 4,6-diaminoresorcinol, 2,5-diaminohydroquinone or 2,5-diamino-4,6-dithiobenzene or an acid salt thereof.

13. The process of claim 4 wherein the advancement stage is completed in no more than about 2 hours.

14. The process of claim 4 wherein the growth in the number average molecular weight of the polybenzazole during the advancement stage is at least about 50 percent.

15. The process of claim 4 wherein the growth in the number average molecular weight of the polybenzazole during the advancement stage is at least about 100 percent.

16. The process of claim 4 wherein the growth in the weight average molecular weight of the polybenzazole during the advancement stage is at least about 50 percent.

17. The process of claim 4 wherein the growth in the weight average molecular weight of the polybenzazole during the advancement stage is at least about 100 percent.

* * * * *